US011117290B2

(12) United States Patent
Baeck et al.

(10) Patent No.: US 11,117,290 B2
(45) Date of Patent: Sep. 14, 2021

(54) MELTING AND INJECTION DEVICE FOR PLASTIC MATERIALS

(71) Applicant: ENGEL AUSTRIA GmbH, Schwertberg (AT)

(72) Inventors: Gerhard Baeck, Schwertberg (AT); Michael Fischlschweiger, Rottenmann (AT); Werner Kappelmueller, Schwertberg (AT); Lorenz Reith, Linz (AT); Harald Schimboeck, Perg (AT); Georg Steinbichler, Rottenmann (AT); Gregor Hartung, Steyr (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 16/599,977

(22) Filed: Oct. 11, 2019

(65) Prior Publication Data

US 2020/0039112 A1 Feb. 6, 2020

Related U.S. Application Data

(62) Division of application No. 14/743,122, filed on Jun. 18, 2015, now Pat. No. 10,471,630.

(30) Foreign Application Priority Data

Jun. 20, 2014 (AT) .................................. A 485/2014

(51) Int. Cl.
*B29B 13/02* (2006.01)
*B29C 35/02* (2006.01)
(Continued)

(52) U.S. Cl.
CPC ............ *B29B 13/022* (2013.01); *B29C 35/02* (2013.01); *B29K 2077/00* (2013.01); *B29K 2105/0002* (2013.01)

(58) Field of Classification Search
CPC . B29C 45/461; B29C 2045/466; B29C 45/53; B29C 45/542; B29C 45/544; B29C 45/1816; B29B 13/022
See application file for complete search history.

(56) References Cited

U.S. PATENT DOCUMENTS 2,293,304 A     8/1942   Muller
2,792,594 A *   5/1957   Keaton ................... B29C 45/03
                                                 425/165
(Continued)

FOREIGN PATENT DOCUMENTS

AT         511 514       12/2012
CH        542 707       10/1973
(Continued)

OTHER PUBLICATIONS

K. van Rijswijk et al., "Reactive processing of textile fiber-reinforced thermoplastic composites—An overview", ScienceDirect Composites: Part A 38, pp. 666-681, 2007, cited in the specification.
(Continued)

*Primary Examiner* — Xiao S Zhao
*Assistant Examiner* — Emmanuel S Luk
(74) *Attorney, Agent, or Firm* — Wenderoth, Lind & Ponack, L.L.P.

(57) ABSTRACT

An arrangement for melting at least one solid precursor product for polymer production includes a housing for receiving the solid precursor product by way of an opening, and a melting device arranged in the housing. The melting device is disposed so that the solid precursor product can be fed thereto to be melted. A preferably switchable discharge device is connected to an opening of the housing and can be connected to an injection unit.

13 Claims, 8 Drawing Sheets

(51) Int. Cl.
*B29K 105/00* (2006.01)
*B29K 77/00* (2006.01)

(56) References Cited

U.S. PATENT DOCUMENTS

| | | | |
|---|---|---|---|
| 2,831,214 A | 4/1958 | Eyles | |
| 2,885,268 A * | 5/1959 | Weinbrenner | B29B 7/76 422/133 |
| 3,056,846 A | 10/1962 | Glaser | |
| 3,571,856 A | 3/1971 | Voelker | |
| 3,598,282 A | 8/1971 | Phillips | |
| 3,680,995 A | 8/1972 | Frazier, Jr. | |
| 3,719,441 A | 3/1973 | Spaak | |
| 3,746,489 A * | 7/1973 | Rizzi | B29B 7/7485 425/205 |
| 3,752,623 A * | 8/1973 | Sinn | B29B 7/7615 425/206 |
| 3,773,069 A | 11/1973 | Rebentisch | |
| 3,811,405 A | 5/1974 | Baker | |
| 3,827,603 A | 8/1974 | Reighard | |
| 3,888,612 A | 6/1975 | Schrewe | |
| 3,954,362 A | 5/1976 | Boesch | |
| 3,964,645 A | 6/1976 | Scholl | |
| 3,981,416 A | 9/1976 | Scholl | |
| 4,009,974 A | 3/1977 | Scholl | |
| 4,150,088 A | 4/1979 | Chang | |
| 4,308,447 A | 12/1981 | Notzold | |
| 4,390,332 A | 6/1983 | Hendry | |
| 4,404,360 A * | 9/1983 | Hartmann | C08G 69/18 526/64 |
| 4,453,867 A | 6/1984 | Sharps | |
| 4,463,881 A * | 8/1984 | Dais | B29C 45/53 222/375 |
| 4,478,780 A | 10/1984 | Kim | |
| 4,592,491 A | 6/1986 | Chollet | |
| 4,667,850 A | 5/1987 | Scholl | |
| 4,699,581 A | 10/1987 | Nagasaka | |
| 4,848,420 A | 7/1989 | Claassen | |
| 4,994,220 A | 2/1991 | Gutjahr | |
| 5,074,772 A | 12/1991 | Gutjahr | |
| 5,286,187 A | 2/1994 | Niimi | |
| 5,404,866 A | 4/1995 | Possanza | |
| 5,523,537 A | 6/1996 | Johannes | |
| 5,653,534 A * | 8/1997 | Matsumoto | B29C 45/1816 366/76.1 |
| 5,680,963 A | 10/1997 | Brusko | |
| 5,762,855 A | 6/1998 | Betters | |
| 5,971,735 A | 10/1999 | Beck | |
| 6,005,013 A * | 12/1999 | Suh | B29C 44/348 521/79 |
| 6,039,217 A | 3/2000 | Faulkner, III | |
| 6,135,196 A | 10/2000 | Kono | |
| 6,175,101 B1 | 1/2001 | Miller | |
| 6,254,813 B1 * | 7/2001 | Eckardt | B29C 45/1753 264/328.19 |
| 6,276,434 B1 | 8/2001 | Kono | |
| 6,641,142 B2 | 11/2003 | Hegmann et al. | |
| 7,083,403 B2 | 8/2006 | Arai | |
| 8,063,137 B2 * | 11/2011 | Jeram | B29C 67/246 524/588 |
| 8,684,726 B2 | 4/2014 | Berg et al. | |
| 8,932,507 B2 * | 1/2015 | Weber | B29C 45/02 264/328.8 |
| 2003/0001303 A1 | 1/2003 | Arai | |
| 2005/0017412 A1 * | 1/2005 | Maier | B29B 7/7485 264/328.17 |
| 2005/0181086 A1 | 8/2005 | Arai | |
| 2005/0238756 A1 | 10/2005 | Ohgoshi et al. | |
| 2006/0088623 A1 | 4/2006 | Ohgoshi et al. | |
| 2008/0063869 A1 * | 3/2008 | Mortazavi | B29C 48/19 428/411.1 |
| 2008/0190365 A1 | 8/2008 | Lasko | |
| 2008/0303185 A1 * | 12/2008 | Mortazavi | B29C 37/005 264/238 |
| 2009/0311358 A1 * | 12/2009 | Sawa | B29C 45/48 425/148 |
| 2010/0001435 A1 * | 1/2010 | Manley | B29C 67/246 264/328.1 |
| 2012/0114785 A1 | 5/2012 | Berg et al. | |
| 2012/0306113 A1 * | 12/2012 | Kershaw | B29C 45/542 264/40.7 |
| 2012/0313290 A1 | 12/2012 | Steinbichler et al. | |
| 2014/0196807 A1 * | 7/2014 | Ikeda | B29C 45/1866 137/896 |
| 2015/0273746 A1 * | 10/2015 | Koch | B29C 45/80 425/130 |
| 2017/0210031 A1 * | 7/2017 | Tochihara | B29C 48/505 |

FOREIGN PATENT DOCUMENTS

| | | |
|---|---|---|
| CN | 1398707 | 2/2003 |
| CN | 101511564 | 8/2009 |
| CN | 102481715 | 5/2012 |
| CN | 102672875 | 9/2012 |
| CN | 102909819 | 2/2013 |
| DE | 712181 | 10/1941 |
| DE | 1 299 885 | 7/1969 |
| DE | 1 554 855 | 1/1970 |
| DE | 1 595 297 | 1/1970 |
| DE | 1 942 992 | 5/1970 |
| DE | 692 10 197 | 10/1996 |
| DE | 699 28 734 | 9/2006 |
| DE | 600 31 851 | 3/2007 |
| DE | 10 2006 038 804 | 8/2008 |
| EP | 2 454 075 | 5/2012 |
| EP | 2 572 851 | 3/2013 |
| GB | 531100 | 12/1940 |
| GB | 1 153 438 | 5/1969 |
| GB | 1 165 251 | 9/1969 |
| GB | 1 278 307 | 6/1972 |
| WO | 2008/019878 | 2/2008 |

OTHER PUBLICATIONS

Chinese Search Report dated Feb. 4, 2017 in corresponding Chinese Application No. 201510518135.1.
Zhenlong et al., "Plastic Molding Process and Mold Design", University of Electronic Science and Technology of China Press, pp. 241-243 (2013), with English abstract of technical content.
Google Patent Translation of CN 102672875A, 6 pages (Year: 2018).

* cited by examiner

MELTING AND INJECTION DEVICE FOR PLASTIC MATERIALS

BACKGROUND OF THE INVENTION

The present invention concerns an arrangement for melting at least one solid precursor product for polymer production, and an apparatus for the production of a polymer molding comprising at least two different solid precursor products.

The invention is concerned with the topic of melting polymers, prepolymers or polymer precursors for subsequently reactive processing.

A wide range of different approaches can be supposed as known as the state of the art for melting solid precursor products in the form of reactive components and subsequent reactive processing. In the case of lactams, in particular ε-caprolactams and subsequent polymerization to give polyamide 6 that is to be viewed primarily in the context of the following processing steps.

The processing of additivated caprolactam-based melts in reactive installations in the context of the resin injection process is known, in which melting or heating of the precursor products is effected in stirred, generally pressurized or evacuated, vessels. In that case, the components are circulated by way of pump or dual-piston systems. A plurality of reactive components are combined in a mixing element from which the reactive mixture is discharged into an open or closed mold. By way of example in that respect, attention is directed to DE 1 299 885 and DE 600 31 851 T2.

The discontinuous production of components or blocks on a polyamide basis is further known in the context of production of cast polyamide. In that case, the non-additivated monomers are usually melted and stored above melting temperature with the exclusion of moisture in suitably sized containers and are only additivated prior to use.

A further possible way of melting and subsequently processing reactive components, in particular for ε-caprolactam or laurolactam, as described in EP 2 572 851 A1, represents thrust screw plasticization, wherein the melting and injection operations in respect of the respective reactive component are performed in a functional unit.

Particularly for low-viscosity substances it is possible to operate in that context with seals based on polymers (EP 2 454 075 B1). In that respect, the heating and melting process is based on both a shearing action and also thermodiffusion.

Comparable piston-based systems are known, primarily for non-reactive systems, in which the substances to be melted are pressed under pressurization conditions by way of the most widely varying kinds of shearing and mixing portions and thus the energy input is maximized in relation to high-viscosity masses. As an example here, reference may be directed to DE 10 2006 038 804 B3.

As already stated in DE 1 942 992, piston-based systems are further known, in which the preheated reactive components are already mixed in a single piston and discharged only after initiation of the reaction in order to simplify the sealing effect during the displacement of the injection piston, due to the higher viscosity of the reactive mixture. Particularly for very bulky components like, for example, rotor blades of wind turbine rotors vacuum infusion with preferably thermosetting resin systems has become established, corresponding approaches based on low-viscosity precursor substances of thermoplastic polymers like ε-caprolactam were described in Composites: Part A 38 (2007) 666-681.

In current reactive installations for the processing of reactive components liquefied, low-viscosity, additivated components are continuously heated and circulated under high pressure, this entailing a considerable energy consumption. In addition, the components are subjected to a considerable residence time divergence due to the periodic removal of individual aliquots for component production and the feed of new components, which can have a detrimental effect on the stability of the individual components or additives. In particular, the additives used for the production of polyamides by anionic polymerization can be damaged or deactivated by premature autopolymerization. In particular, a substantially larger melt volume is heated throughout and kept above melting temperature than is necessary at the respective moment in time for processing.

In the case of thrust screw-based systems which can be used for melting and metering corresponding reactive components, there is a negligible residence time divergence unlike the situation when using concepts based on melt storage means. By virtue of the implementation of the melting and injection operation in one functional unit, however, the required back-flow blocking means is to be viewed as a weak point, which prevents melted material being urged back into the melting region when there is a build-up of pressure and in the injection process. Particularly in the case of low-viscosity systems, durable sealing and reproducibility is highly problematic in that case. The energy input due to a shearing action is also negligible, in the case of low-viscosity systems.

The joint injection of the reactive components after previous mixing in an injection piston is to be viewed as a disadvantage in particular in regard to reproducibility and possible deposits in the injection piston used. In addition, that principle cannot be economically applied a priori in the case of more complicated and expensive shape geometries and with longer flow paths as the situation would involve hardening prior to complete filling of the component cavity. In addition, the injection of a mixture which is already of higher viscosity means that the infiltration of textile reinforcing elements like, for example, a fiber semi-finished product or preform is made seriously more difficult.

SUMMARY OF THE INVENTION

The object of the invention is to provide an arrangement of the general kind set forth and an apparatus for the production of a polymer molding from at least two different solid precursor products, in which the above-discussed problems do not occur or occur at least only to a reduced extent.

That object is attained by an apparatus for the production of a polymer molding from at least two different solid precursor products with at least two such arrangements.

The invention permits a two-stage process in which the melting and injection operation of reactive components can be implemented in different elements of the installation. The melting process is preferably performed in a possibly inertised or evacuated melting arrangement intended for that purpose and which is preferably formed with a housing of a cylindrical configuration. Particularly preferably, at least one feed unit is connected to an opening of the housing, for the solid precursor product. The injection process into the cavity of a molding tool of a molding machine is performed by an injection unit separate therefrom.

Unlike the situation in a current reactive installation which operates in a recirculatory mode and in which molten material for a plurality of components is kept at an elevated temperature in the day tank and circulated therein, the invention ensures that only those amounts are melted, which are also used for the subsequent processing operation, whereby it is possible to counteract an unnecessary thermal loading on the reactive components over a longer period of time or an uncontrollable residence time divergence.

In the invention, the starting raw substances which are in powder, flake, or pellet form (solid precursor products) are passed preferably from above or laterally on to the melting apparatus by at least one feed unit. That melting element preferably has a conical configuration and is operated for example at a temperature which is at least 5° C. above the melting point of the components to be melted.

When the solid precursor product is incident on the surface of the melting apparatus, it is melted and collects in molten form in a preferably heated collecting zone disposed therebeneath (for example a melting tank). A fit which is as tight as possible (0.05-2 or 5 mm) between the melting apparatus and the housing ensures that no solids can pass into the collecting zone therebeneath.

When sufficiently melted material is present in the collecting zone, the discharge device can be opened whereby the molten material passes to and fills the injection unit. After filling of the injection unit (in the case of a piston injection unit of the piston antechamber), the discharge device is closed and injection is permitted in the injection direction (for example by piston movement). Thus, the discharge device is switchable between an open position and a closed position. By virtue of a suitable structural design configuration for the collecting zone, it is possible in that way to cover a wide band width in terms of injection volumes. The discharge device preferably has a moveable closure element (slider or flap).

The feed of the solid precursor product by the feed unit can be effected for example by a screw, spiral, pump, conveyor belt, or vacuum suction conveyor device, optionally supported by discharge aids like a vibration discharge device through a shaker channel, an oscillating plate or the like.

The feed unit can be structurally separate from the melting device by a separating device, for example by a cell wheel rotary valve, a flap, diaphragm or sintered disc.

The feed of the solid precursor product can be effected gravimetrically or volumetrically.

At least one device for temperature control of the housing, that is separate from the at least one heating device, can be provided. The temperature control device can be in the form of a heating belt, casing temperature controller, inductive heating, resistive heating or the like.

The melting device is preferably arranged centrally in the housing and preferably has a cone-shaped or pyramid-shaped configuration, tapering upwardly. Preferably the melting device is arranged displaceably in the housing (for example displaceably in respect of height and/or axially and/or radially).

The melting device can be made, for example, from metal or ceramic.

Preferably, the melting device is structurally designed so that the solid precursor product is passed laterally or from above on to a heated surface inclined relative to the horizontal. Preferably, besides other shapes, a conical shape or an inclined plate is conceivable (better to clean but less surface area).

Temperature control of the melting device is preferably effected by an internal temperature controller. From the aspect of the temperature range, temperature control is to be adapted to the component or components to be melted and will generally be in a range of 70° C.-250° C.

The discharge device can be in the form of an actively actuable discharge valve (or tap, or flap, lock device, pump connection, slider). Actuation of the discharge device can be effected electrically, pneumatically, hydraulically, piezoelectrically, or magnetically.

When a pressure regulating device is provided, the pressure level can be varied at least in the region of the at least one melting device and/or feed unit by the application of reduced pressure (vacuum) or increased pressure, for example, of between 0.01 and 10 bars, more especially between 0.2 and 1.5 bars.

A device for introducing a protective gas (for example $N_2$, Ar, synthetic or dried air) into the housing can also be provided.

A filling level sensor (for the solid precursor product and/or the melt) can be provided. Filling level measurement can be effected both above the melting device and also in the region of the collecting zone or a bypass pipe. Filling level measurement can be effected by capacitive, resistive, conductive, radiometric, inductive, vibronic, gravimetric or sound wave-based measurement principles.

A stirring and/or mixing device for promoting homogenization can be disposed in the collecting zone, possibly integrated into a housing which also optionally rotates.

Measures can be provided for temperature homogenization by heat exchangers between the arrangement and the injection unit, and/or static mixing portions can be provided.

It is also possible to provide an introduction device for introducing fluid or solid additives beneath the melting device.

When melting a plurality of components in corresponding arrangements, the volume flows before passing into the cavity of the molding tool (i.e., upstream of the molding tool) can be mixed/homogenized in a separate mixing head/mixing element or in a dedicated cavity which can be attributed to the molding tool.

Preferably, additivated mixtures of ε-caprolactam or laurolactam, precursor products of thermoplastic epoxy resins or cross-linking silicones are used as solid precursor products for polymer production.

The solid precursor products may contain additives, in particular for initiation and acceleration of the reaction, regulation of the chain length and the degree of branching, stabilization of the polymers obtained or cross-linked end products (UV protection, flame protection, antioxidants), functional additives, dyes and chromophores, fillers, crystallization aids and nucleation agents, modifiers for improving mechanical properties, in particular impact strength, coupling agents for promoting possible fiber/matrix bonding, removal of troublesome moisture or other low-molecular substances and mold release aids.

It is possible to provide for an introduction of a textile reinforcement or generally separate introduction of fibers and/or fillers into one or more cavities of the molding tool.

The injection of the individual molten precursor products can be effected with a constant volume flow, constant pressure, predetermined pressure or volume profile or intermittently.

In addition, a process includes melting at least one solid precursor product for polymer production. Therein, a first step is placing the solid precursor product in a housing by way of an opening. That step is followed by the feed of the solid precursor product, preferably by way of a feed unit (conveyor unit) connected to the housing, to a melting device in the housing. The solid precursor product is melted by the melting device to form a melt. As a result, the melt collects in a collecting zone for same. Lastly, the melt is also discharged by way of a discharge device connected to the housing to an injection unit connected to the discharge device. In that way, the injection unit is filled with the melt. The discharge device is closed prior to injection of the melt into a cavity of a molding tool by the injection unit.

A process for the production of a preferably fiber-reinforced plastic component includes the process for melting at least one solid precursor product for polymer production. In that respect, essential steps are mixing of the melts to give a reactive matrix, the preparation of an insert portion or a reinforcing element in a cavity of a molding tool, introduction of the reactive matrix into the cavity of the molding tool, hardening the reactive matrix together with the insert portion or together with the reinforcing element to form a plastic component, and removal of the fiber-reinforced plastic component from the molding tool. Optionally, the insert portion or the reinforcing element can be in the form of a fiber preform. Optionally, it is also possible for the cavity to be evacuated prior to the filling operation. Preferably, it is further possible for the melt to be mixed from two different melting devices. In that case, mixing can be effected during the injection operation or locally between the cavity and the injection piston. Mixing can also be effected in a mixing element disposed upstream of the cavity (feed head, mixing head, adaptor plate, mixing cavity, static mixer). In particular, when an insert portion or reinforcing element is provided in the cavity, preferably a reactive mixture is introduced into that cavity. The insert portion or the reinforcing element is impregnated or has the mixture injected therearound, in that way. That is followed by hardening of the reactive matrix. Finally the cavity is opened and the component is removed.

BRIEF DESCRIPTION OF THE DRAWINGS

Further details of the invention are discussed with reference to FIGS. 1 through 8 which show various embodiments of the arrangement, by way of example.

DETAILED DESCRIPTION OF THE INVENTION

Figure 1:
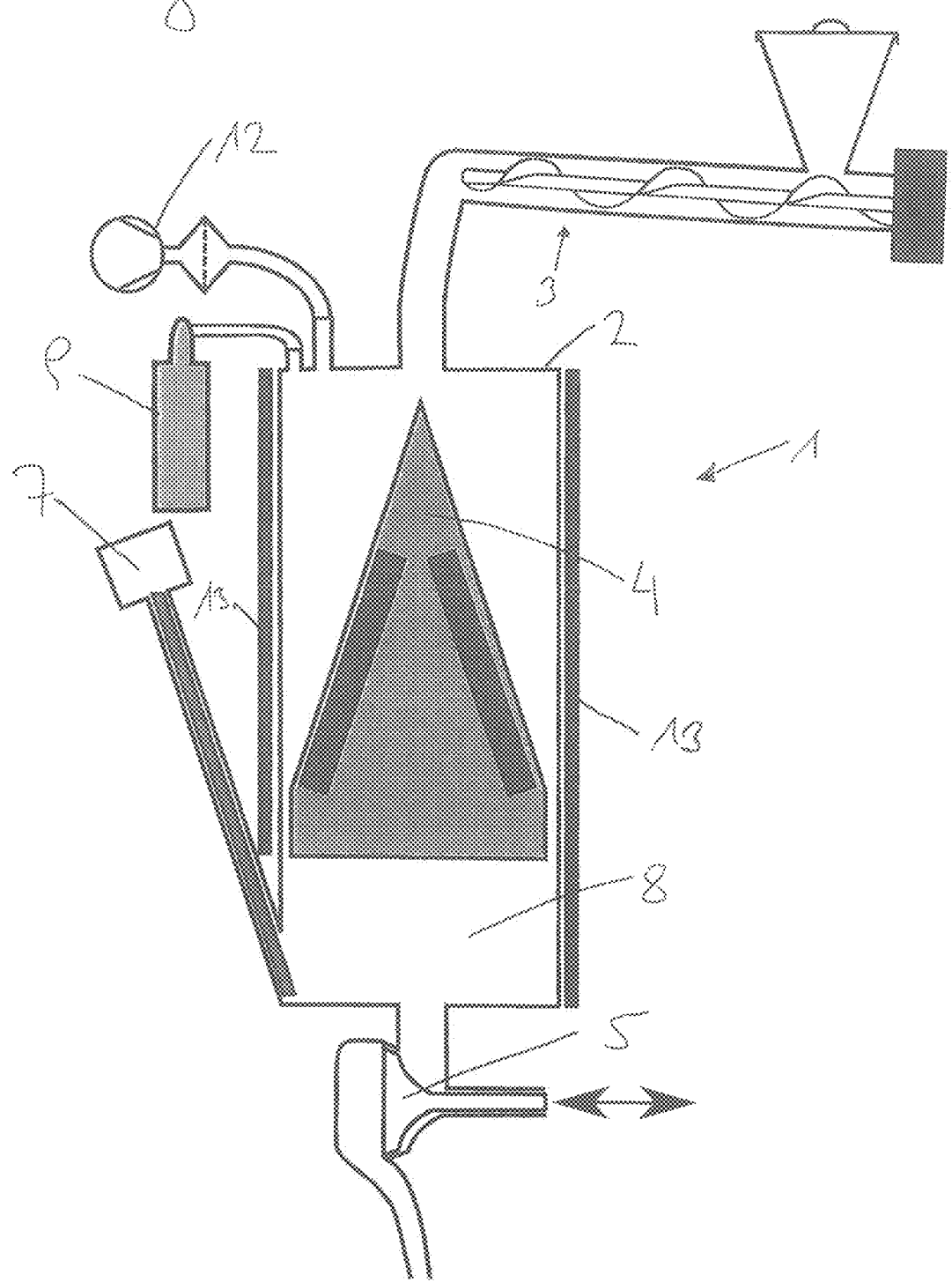

FIG. 1 shows a first embodiment having an arrangement 1 which has a housing 2 in which is arranged a preferably heated melting device 4 to which a solid precursor product can be fed by way of a feed unit 3 (here a screw conveyor). The melting device 4 is conical (cone-shaped) and oriented in the vertical direction such that tips of the cone or pyramid-shaped melting devices 4 point to a respective inlet opening of the housing 2 through which is supplied the first solid precursor product. Furthermore, each melting device 4 has an internal temperature controller. In addition, a heating device 13 is provided for heating the walls of the housing 2. The molten material collects beneath the melting device 4 in a collecting zone 8, from where it can be discharged through a switchable discharge device 5. Also provided is a filling level sensor 7. Also shown are a gas introducing device 9 for the introduction of a protective gas and a pressure regulating device 12.

Figure 2:
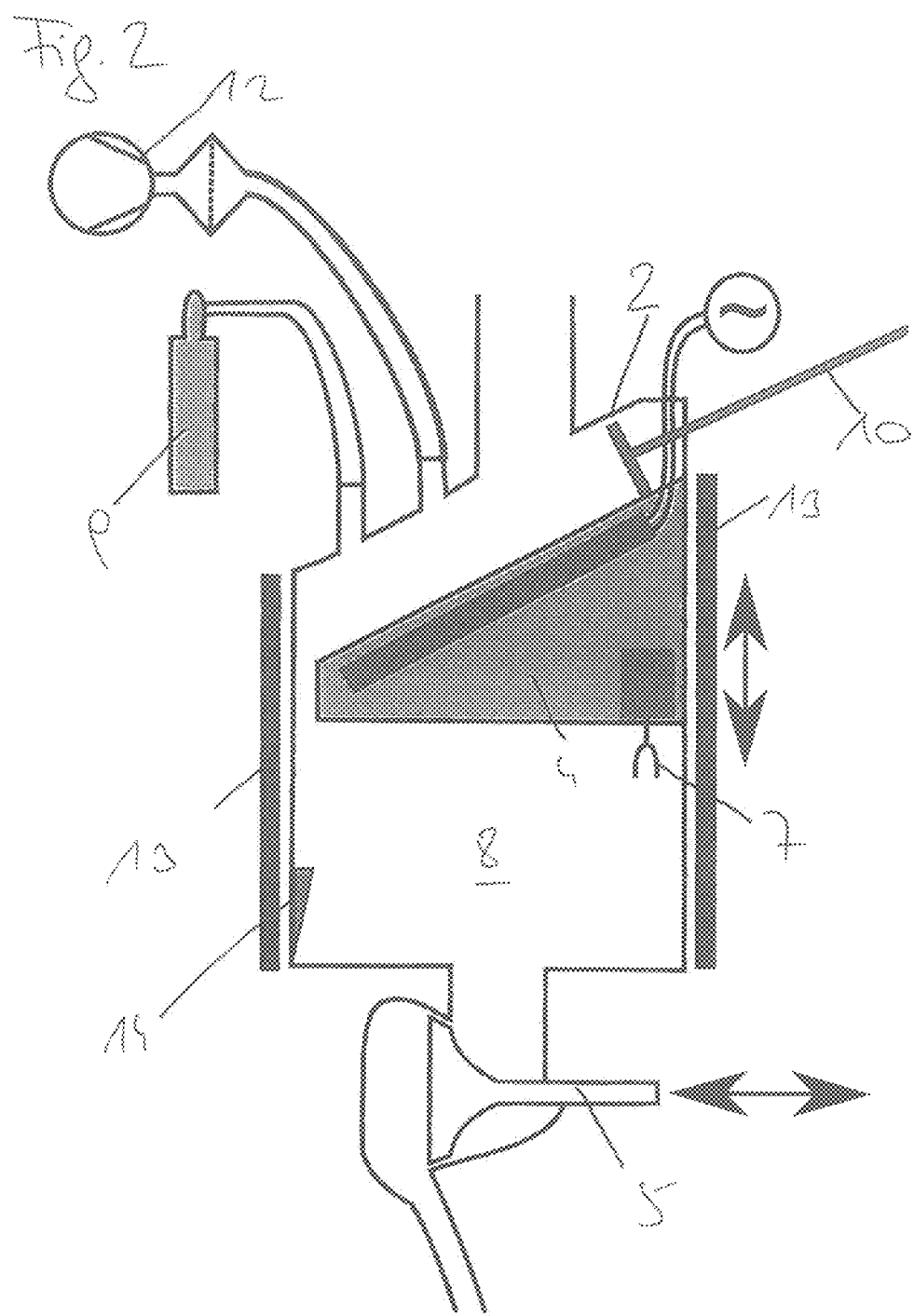

In the variant shown in FIG. 2, the filling level sensor 7 is in the form of an oscillating fork sensor. The double-headed arrow indicates the adjustability in height of the melting device 4 which here is in the form of an inclined plate. A stripping device 14 and a slider 10 are also provided. In both the first embodiment of FIG. 1 and the second embodiment of FIG. 2, the solid precursor product passes from the respective feed unit 3 through the inlet opening of the housing 2 and onto a heating surface of the melting device 4. The heating surface is inclined relative to horizontal and is located vertically below the inlet opening of the housing 2. As also illustrated in FIGS. 1 and 2, the discharge devices 5 are arranged vertically below the collecting zones 8 and below the melting devices 4. Thus, when the discharge devices 5 are opened, the molten material flows from the collecting zones 8 into a respective injection unit 6 (see FIG. 3).

Figure 3:
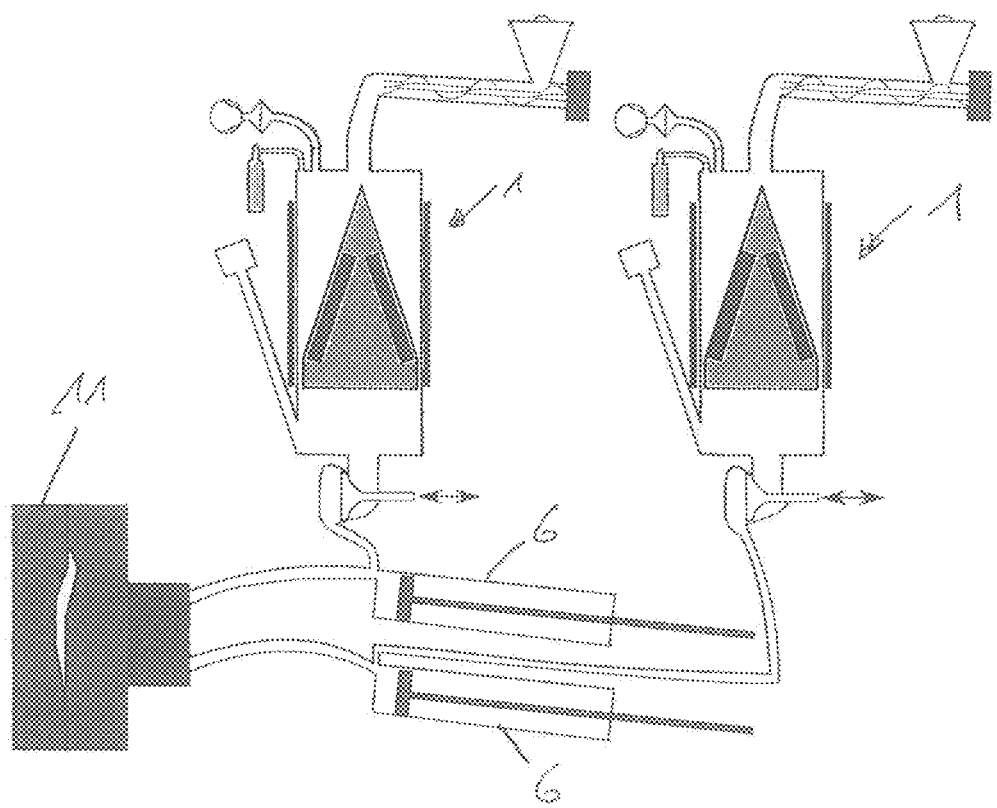

FIG. 3 shows an apparatus for the production of a polymer molding from at least two different solid precursor products having at least two arrangements 1 as shown in FIG. 1. The melts are introduced into a cavity of a common molding tool 11 by injection units 6. Each discharge device 5 is connected to a respective injection unit 6 directly or by way of a conduit such as a mold discharge hose or pipe connection.

Figure 4:
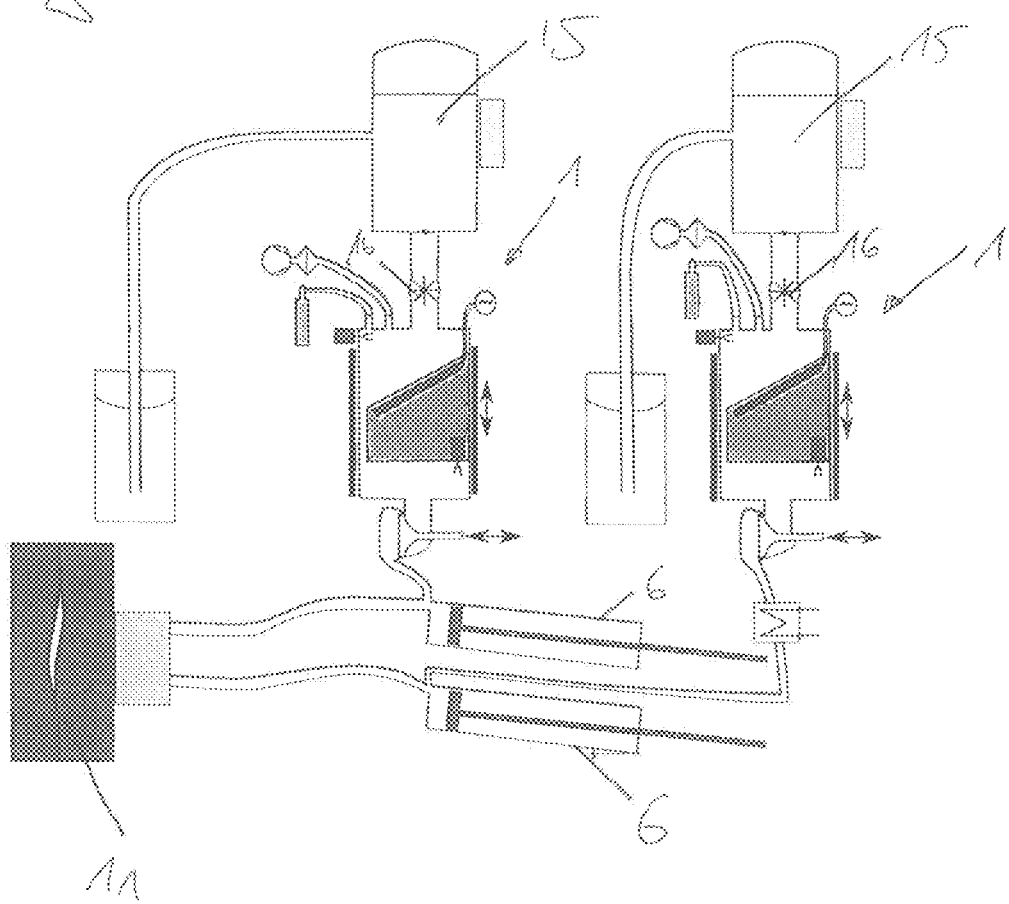

FIG. 4 shows the same apparatus as in FIG. 3, but with arrangements which substantially correspond to FIG. 2. Here, however, a feed unit 3 in the form of a suction conveyor with a storage container 15 and a separating device 16 is arranged between the feed unit 3 and the melting device 4, in the form of a cell wheel rotary valve.

Figure 5:
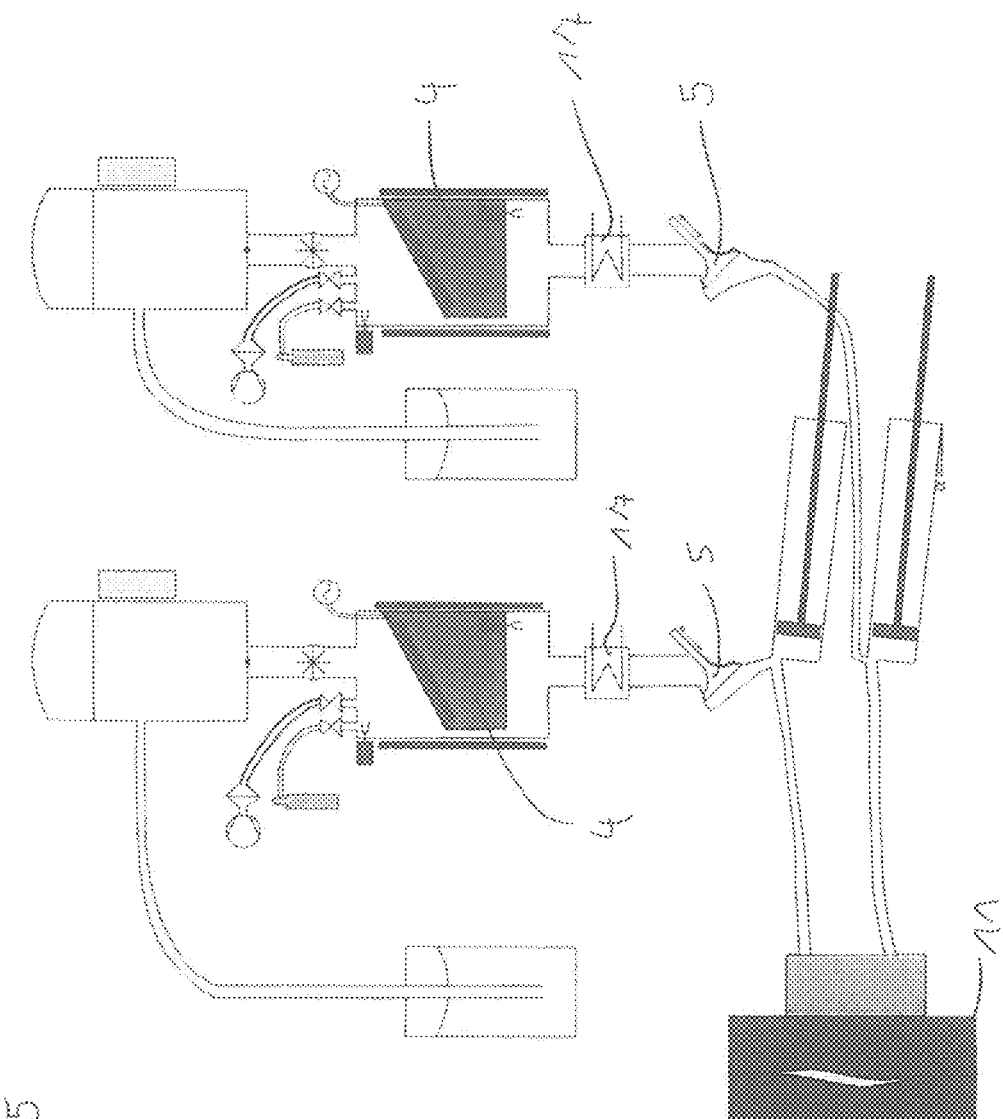

FIG. 5 shows modifications in relation to FIG. 4, in which the discharge devices 5 (switch-over valves) are shown inclined. In addition, the conduits between the discharge devices 5 and the melting devices 4 are increased in length. An additional temperature control element 17 is also disposed in those conduits, which can also be in the form of a heat exchanger and which can also serve for thermal homogenization of the melt.

Figure 6:
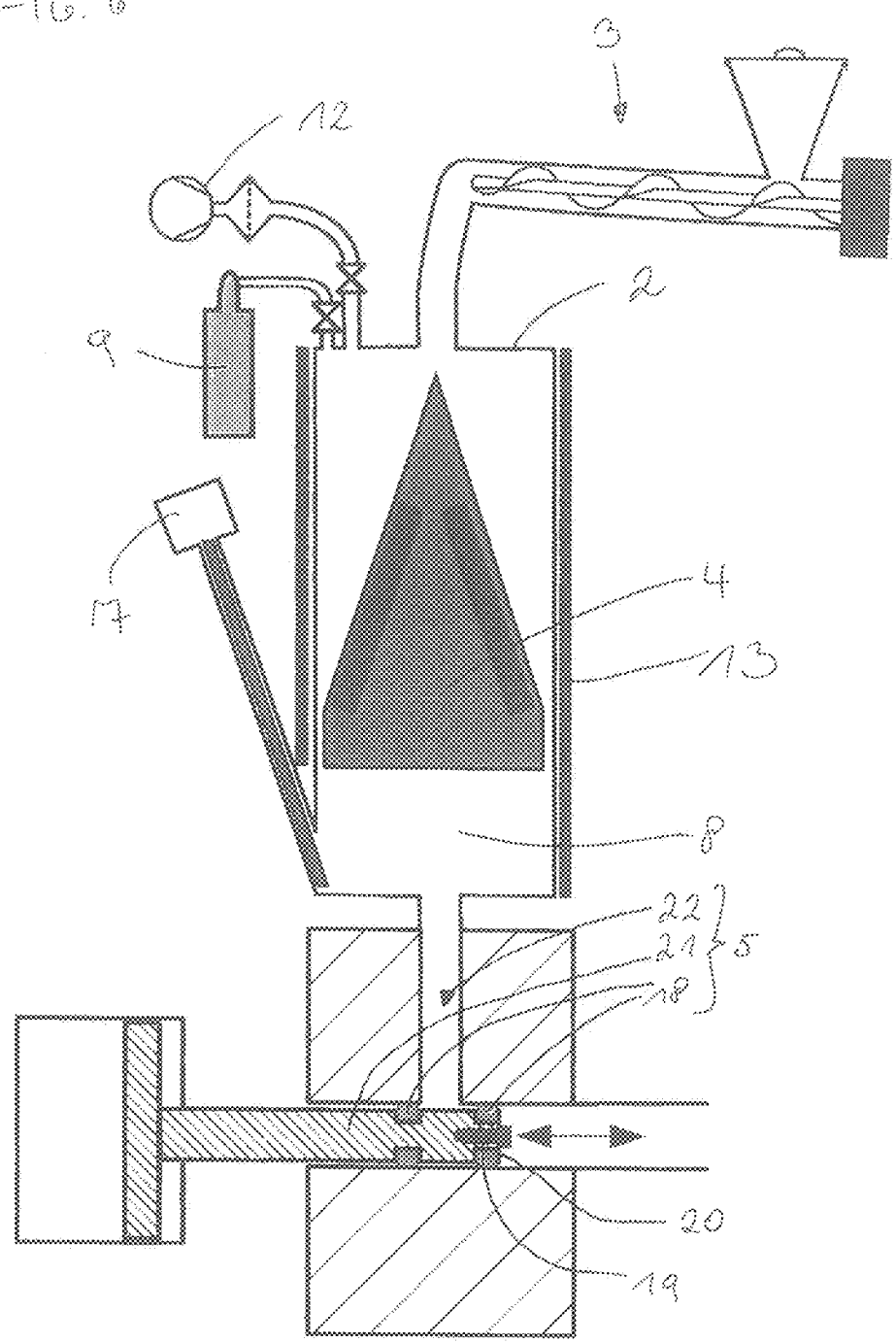
Figure 7:
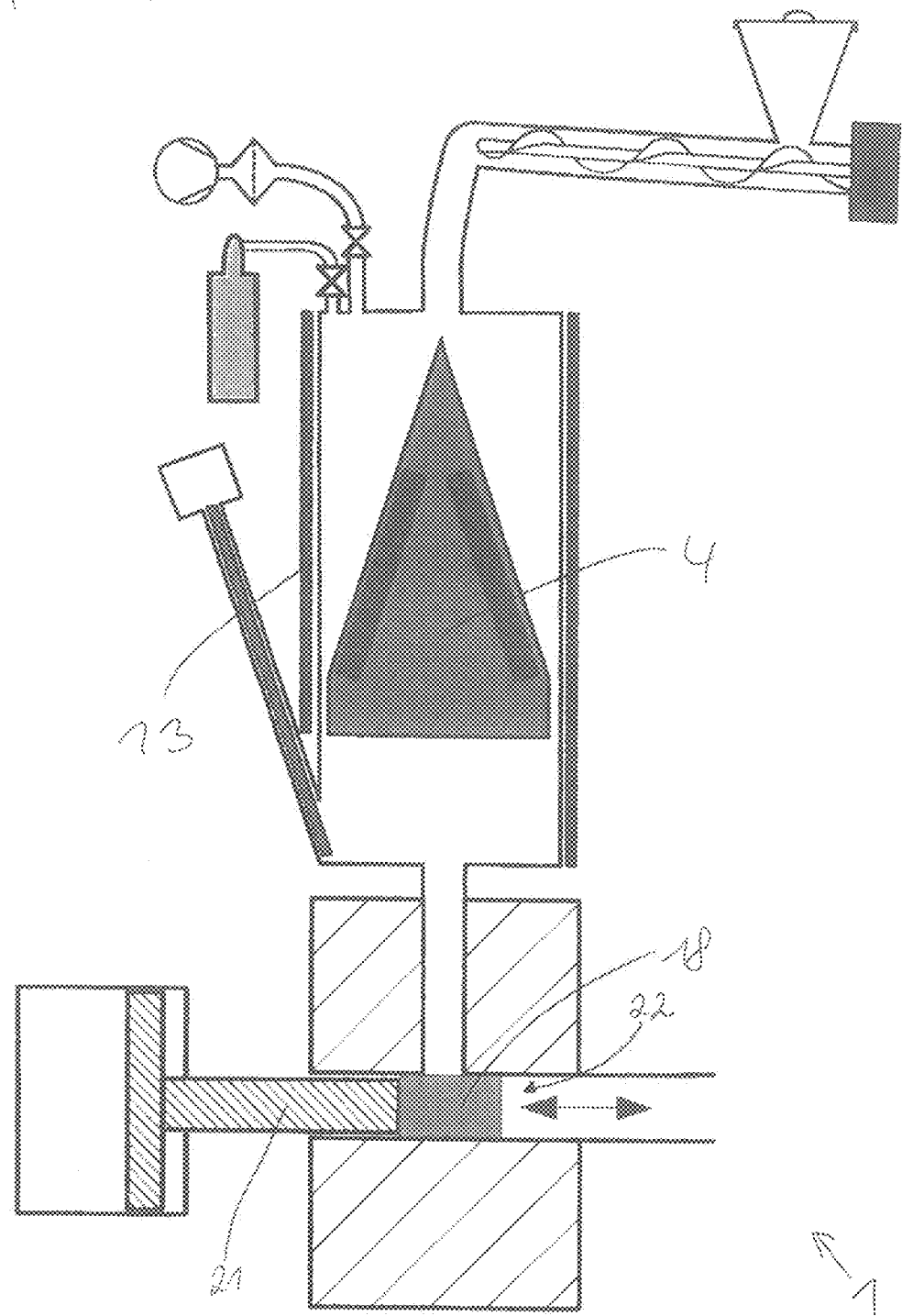
Figure 8:
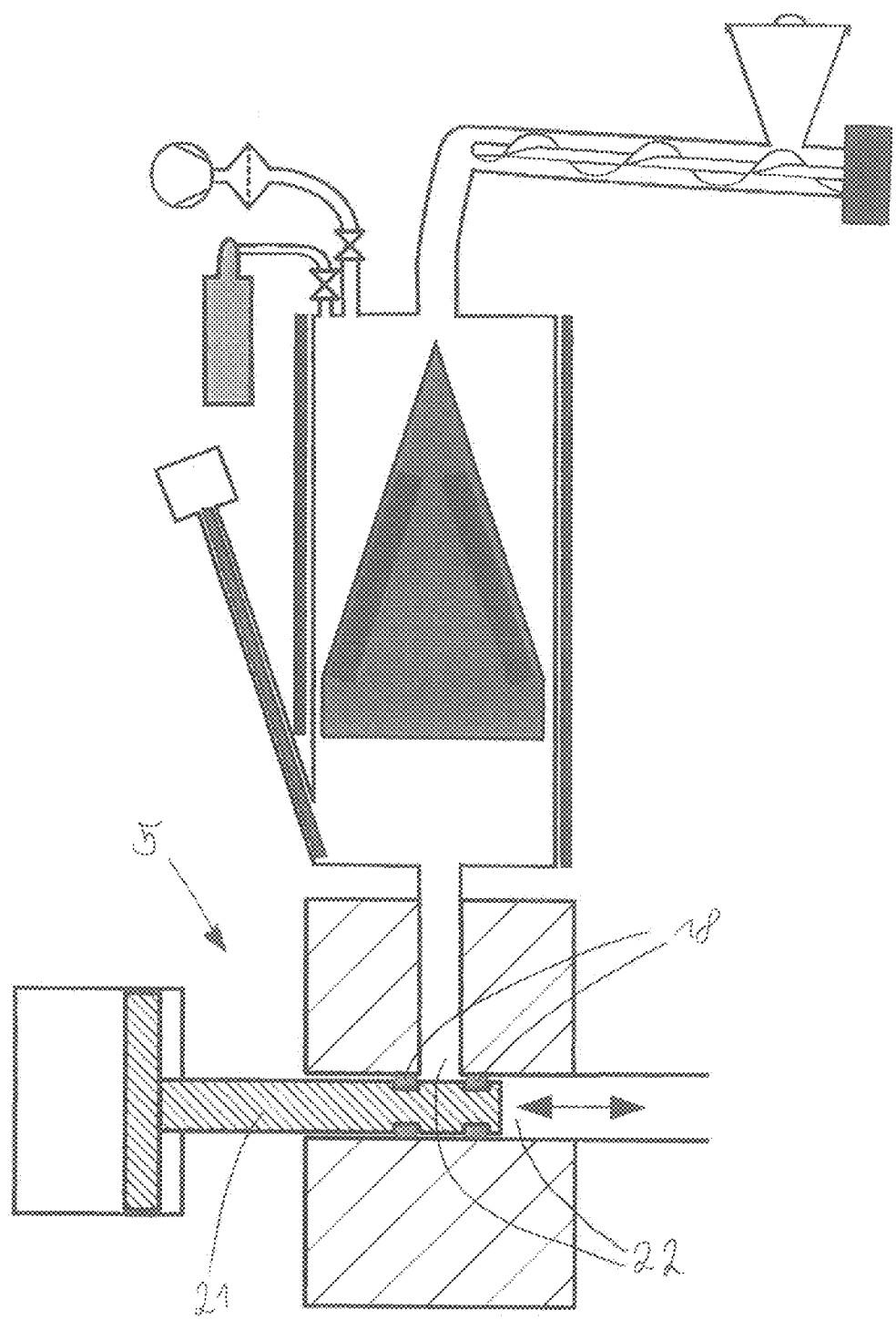

In FIGS. 6 through 8, the discharge device 5 (switch-over valve) is not formed by a valve head-valve seat combination, but has a closure element 21 in the form of a slider, a seal 18, and the discharge passage 22. The seal 18 can for example comprise a ceramic material. Preferably, the seal 18 comprises a plastic, in particular a polymer. In FIG. 6, the front part (shown at the right-hand side) of the seal 18 is fitted on to the piston-shaped closure element 21 of the discharge device 5 and is fixed by a screw 19 and a holding plate 20. In FIG. 7, a single longer seal 18 is disposed around or on the entire front shank region (closure element 21) of the discharge device 5. In contrast, FIG. 8 shows a variant in which the preferably polymer seal 18 is applied to the slider (closure element 21) in the form of two mutually spaced, cast sealing rings.

LIST OF REFERENCES 1 arrangement
2 housing
3 feed unit
4 melting device
5 discharge device
6 injection unit
7 filling level sensor
8 collecting zone
9 device for introducing a protective gas
10 slider
11 molding tool
12 pressure regulating device
13 heating device
14 stripping device
15 storage container
16 separating device
17 temperature control element
18 seal
19 screw
20 holding plate 21 closure element
22 discharge passage

The invention claimed is:

1. A melting process for melting solid precursor products for polymer production, the process comprising:
  receiving a first solid precursor product in a first housing through a first opening, the first solid precursor comprising a first additive mixture of ε-caprolactam,
  receiving a second solid precursor product in a second housing through a second opening, the second solid precursor comprising a second additive mixture of ε-caprolactam, the first housing being separate from the second housing,
  feeding the first solid precursor product to a first melting device arranged in the first housing, the first melting device including an inclined heating surface for melting the first solid precursor, the inclined heating surface having an upper end located closest to the first opening,
  feeding the second solid precursor product to a second melting device arranged in the second housing, the second melting device including an inclined heating surface for melting the second solid precursor, the inclined heating surface having an upper end located closest to the second opening,
  melting the first solid precursor product using the first melting device to obtain a first melt,
  melting the second solid precursor product using the second melting device to obtain a second melt,
  discharging the first melt by a first discharge device connected to the first housing to a first injection unit connected to the first discharge device, and
  discharging the second melt by a second discharge device connected to the second housing to a second injection unit connected to the second discharge device, the first injection unit being separate from the second injection unit.

2. The melting process as set forth in claim 1, wherein each of the first solid precursor product received in the first housing and the second solid precursor product received in the second housing further comprises at least one of precursor products of thermoplastic epoxy resins, and crosslinking silicones.

3. The melting process as set forth in claim 1, wherein said melting the first solid precursor product comprises melting only an amount of the first solid precursor product to be used in a subsequent processing operation, and said melting the second solid precursor product comprises melting only an amount of the second solid precursor product to be used in the subsequent processing operation.

4. The melting process as set forth in claim 1, wherein the first solid precursor product is fed to the first melting device by a first feed unit connected to the first housing, and the second solid precursor product is fed to the second melting device by a second feed unit connected to the second housing, the first feed unit being separate from the second feed unit.

5. The melting process as set forth in claim 1, further comprising:
  after melting the first solid precursor product using the first melting device, collecting the first melt in a first collecting zone located beneath the first melting device for discharge via the first discharge device, and
  after melting the second solid precursor product using the second melting device, collecting the second melt in a second collecting zone located beneath the second melting device for discharge via the second discharge device.

6. The melting process as set forth in claim 5, wherein the first discharge device is a first discharge valve connected to the first housing for controlling a flow of the first melt from the first collecting zone to the first injection unit, and
  the second discharge device is a second discharge valve connected to the second housing for controlling a flow of the second melt from the second collecting zone to the second injection unit.

7. The melting process as set forth in claim 1, wherein the first discharge device is a first discharge valve connected to the first housing for controlling a flow of the first melt from the first housing to the first injection unit, and
  the second discharge device is a second discharge valve connected to the second housing for controlling a flow of the second melt from the second housing to the second injection unit.

8. The melting process as set forth in claim 1, wherein the first melting device has a tip pointing toward the first opening, and the second melting device has a tip pointing toward the second opening.

9. The melting process as set forth in claim 1, further comprising:
  feeding the first solid precursor product to the first opening of the first housing by a first screw conveyor, and
  feeding the second solid precursor product to the second opening of the second housing by a second screw conveyor.

10. A production process for producing a fiber-reinforced plastic component comprising the steps:
  supplying the first melt and the second melt produced by the melting process as set forth in claim 1 from the first injection unit and the second injection unit, respectively, to a molding tool via a first conduit and a second conduit, respectively,
  mixing the first melt and the second melt in the molding tool to obtain a reactive matrix,
  providing an insert portion or a reinforcing element in a cavity of the molding tool,
  introducing the reactive matrix into the cavity of the molding tool,
  hardening the reactive matrix together with the insert portion or together with the reinforcing element to obtain a fiber-reinforced plastic component, and
  removing the fiber-reinforced plastic component from the molding tool.

11. A production process for producing a fiber-reinforced plastic component comprising: supplying the first melt and the second melt produced by the melting process as set forth in claim 1 from the first injection unit and the second injection unit, respectively, to a molding tool via a first conduit and a second conduit, respectively.

12. The production process as set forth in claim 11, wherein the first melt and the second melt are mixed together in the molding tool.

13. A melting process for melting solid precursor products for polymer production, the process comprising:
  feeding a first solid precursor product to a first opening of a first housing by a first screw conveyor,
  feeding a second solid precursor product to a second opening of a second housing by a second screw conveyor,
  receiving the first solid precursor product in the first housing through the first opening, the first solid precursor comprising a first additive mixture of ε-caprolactam,
  receiving the second solid precursor product in the second housing through the second opening, the second solid precursor comprising a second additive mixture of ε-caprolactam, the first housing being separate from the second housing, feeding the first solid precursor product to a first melting device arranged in the first housing, feeding the second solid precursor product to a second melting device arranged in the second housing, melting the first solid precursor product using the first melting device to obtain a first melt, melting the second solid precursor product using the second melting device to obtain a second melt, discharging the first melt by a first discharge device connected to the first housing to a first injection unit connected to the first discharge device, and discharging the second melt by a second discharge device connected to the second housing to a second injection unit connected to the second discharge device, the first injection unit being separate from the second injection unit.

* * * * *